UNITED STATES PATENT OFFICE 2,405,566

METHODS OF PREPARING AN OXYGEN LIBERATING COMPOSITION

David A. Feigley, Jr., Pittsburgh, Pa., assignor to Mine Safety Appliances Company, Pittsburgh, Pa.

No Drawing. Application April 3, 1942, Serial No. 437,526

16 Claims. (Cl. 252—186)

This invention relates to an oxygen liberating composition and, more particularly, to compositions including alkali peroxides which regenerate exhaled air to render it fit for further breathing and which supply additional oxygen for replenishing oxygen used.

Anhydrous alkali peroxides, such as sodium or potassium peroxide, are the commercial forms of the high oxides of this class of metals. The material is not useful for respiration purposes because of its physical properties and it is necessary to process or treat the material in some manner to make it suitably reactive with carbon dioxide and moisture in the air to absorb carbon dioxide and replenish oxygen used. Granulated anhydrous peroxides of these alkali metals are unreactive with moisture in the air at temperatures around 50° F., comparable to winter temperatures, and, consequently, they can be processed under such manufacturing conditions provided the humidity is not too great, that is, a humidity of less than 50%. The commercial material when used for respiration purposes requires treatment accomplished by chemical reaction to make it hard and porous. This treatment necessitates the use of some substance reactive with the anhydrous material and preferably a substance that permits some control of the reaction, at least to the extent that anhydrous peroxide and the added substance do not react by mixture when exposed to the atmosphere.

It is the customary practice, in preparing alkali peroxide material for respiration use, to add an amount of hydrated alkali peroxide to commercial anhydrous alkali peroxide to produce an exothermic reaction forming a hard and porous peroxide product. The reaction takes place while the materials are under pressure. Oxygen is evolved to make the product porous while reaction, heat and pressure increase the hardness of the original material sufficiently to withstand rough usage and prevent pulverization. Fines of peroxide are harmful to the respiratory system and can not be used. The treated material is granulated to a certain extent and placed in a container through which vitiated air passes and purification and oxygen replenishment results.

This method of treatment results in many disadvantages, the most important of which is a premature reaction between the hydrate and a portion of the peroxide which occurs unless the processing is carried on under extremely low temperatures and results in a loss of oxygen to the alkali peroxide mass when a hydrated material is added. Also, a premature reaction reduces the oxygen capacity of the mass since it does nothing to render the peroxide porous. Since these materials are used under conditions where weight is an important factor, any premature reaction reduces the capacity of the mass per unit weight and renders the batch of little value. Sometimes the premature reaction continues until the end of the reaction between the hydrate added and the peroxide, although the spontaneity of the reaction, when initiated, continues in all instances to destroy the mix. While a hydrate is most commonly used, compounds having water of crystallization have been substituted for or used in conjunction with the hydrate.

In U. S. Patent No. 2,160,542, means are disclosed for avoiding premature reaction and, in effect, controlling the initiation of the reaction of the added hydrate with the anhydrous peroxide by supplying an inert fluid medium of carbon tetrachloride to a mixture of hydrate and peroxide. This protective fluid separates the hydrate particles from the peroxide particles under normal mixing conditions and prevents reaction, but only to a limited degree, because only a limited amount of hydrate can be added using this method. In using carbon tetrachloride, the fluid must cover the whole of the mix intimately, and the constituents of the mixture must be added carefully and in a certain manner. After the mixture is made, the heat applied for reacting hydrate and peroxide drives off the carbon tetrachloride, allowing the peroxide and hydrate to react. This method of controlling the time of initiating the processing reaction of the principal constituents and protecting against the atmosphere presents the difficult problem of protecting the workmen against the toxic and obnoxious effects of this fluid since a certain amount of the fluid vaporizes continually into the atmosphere about the location of operation. This is advantageous from the standpoint of protecting the mixture against the effects of moisture and carbon dioxide in the atmosphere, but is obnoxious and causes considerable inconvenience to those performing the method.

Other precautionary measures must be taken in the use of this fluid. While it is necessary that carbon tetrachloride be intimately mixed with the other constituents, it is also necessary that it be completely removed from the product because any trace of this fluid remaining in the processed material contaminates purified air passing through a layer of the material. Consequently, an additional step of heating the hard, porous peroxide under vacuum to remove as much of the fluid as possible has to be made in the treatment of the peroxide. However, adequate heating tends to reduce the oxygen capacity of the peroxide and increases the cost of its manufacture. Furthermore, the product appears to swell when reacting with air which plugs the air passages in a layer of the material and increases the resistance.

It is an object of this invention to provide a method of treatment of an alkali peroxide for respiration purposes involving adding a relatively small amount of an unreactive substance to alkali peroxide which, when subjected to heat and pressure, reacts with the peroxide to form a hard, porous oxygen liberating composition.

A further object of this invention is to provide a method of treating anhydrous peroxide material by adding a small quantity of a combinable material having acid characteristics which is unreactive with peroxide when a mixture is exposed to the atmosphere but which reacts with the peroxide under heat and pressure to the extent of complete neutralization of the acid content to form a hard porous oxygen liberating composition.

Another object of this invention is to provide a method of treatment of alkali peroxide material by adding to a mass of comminuted peroxide an acid material capable of being readily mixed with peroxide, the acid material being unreactive with peroxide when mixed therewith and exposed to the atmosphere, sufficiently effective when used in small weight proportion to a quantity of peroxide to react with the peroxide to produce a useful product for respiration purposes, available in commercial quantities at low cost and adaptable to commercial methods of treatment of peroxide material without requiring considerable departure from previous methods used.

Other objects of this invention will become apparent from a description of a preferred method which has made possible manufacture of an improved alkali peroxide material for respiration in large quantities at a low cost.

This preferred method includes the use of a quantity of acid material which may be any material, liquid or solid, which is unreactive with alkali peroxide material under ordinary working conditions when mixed with the peroxide but which is reactive under heat and pressure with anhydrous alkali peroxide to liberate water and form a desirable product for the intended purpose. It is preferred that the material be some commercially available acid or acid salt. One such acid is ortho boric acid ($H_3BO_3$). This acid is a solid at ordinary temperatures and is added directly to the granulated peroxide at an ambient temperature of around 55° F. The mass is mixed to distribute the boric acid throughout the much larger amount of alkali peroxide by means of a tumbling barrel. This mixer can be merely a barrel rotated in an eccentric fashion about a driving axis, which, obviously, does not produce an intimate mixture such as when using a muller type of mixer. It may be advisable to add to the two constituents before mixing some form of a heavy metal catalyst usually added to these oxygen liberation compositions for initiating reaction with vitiated air. This heavy metal catalyst may be any chloride, sulphate, oxide or carbonate of what are usually termed the heavy metals or metals having an atomic number greater than 23 and in the periodic groups from 5 to 8, inclusive, and the subgroups of the periodic table.

After mixing is completed, a quantity of the resulting mass is placed in a mold capable of being heated and subjected to pressure and having a certain internal volume. It is necessary in this method that the volume be somewhat predetermined because the material is to be subjected to an adequate pressure which is a factor in determining the hardness of the product and in protecting the peroxide against excessive reaction. The material in the mold is then subjected to a force adequate to seal off the material from the atmosphere and to subject the chemical to a pressure, for example, of around 200 pounds per square inch. While the material is in the mold and subjected to pressure, it is placed on a heating plate to raise its temperature to the point where the reaction begins. In commercial practice, the start of the reaction may be determined by a noticeable temperature increase over that supplied by the plate and can be observed merely by placing the hand on the mold and noting the rise in temperature. After the reaction starts, it carries on to completion since the reaction is sufficiently exothermic to do so.

During the mixing operation and the removal of the granulated mass from the mixer to the mold, no noticeable reaction occurs, even though the mass is exposed to the atmosphere, provided the temperature is not in excess of 55° F. At summer temperatures, some care is required to prevent initiating the reaction before desired, so it is preferred, if possible, to hold the temperature below the specified temperature when using ortho boric acid. The permissible temperature will depend on the acid material used and the humidity of the atmosphere. The humidity should be maintained as low as possible, and, at a temperature around 55° F., the humidity ought not exceed 50% to allow some flexibility in changing proportions and to insure against the loss of a mix by a premature reaction. Boric acid in a mixture has no apparent effect on alkali peroxide until the temperature is raised beyond the temperature of normal working atmosphere.

The equipment necessary for these operations and the steps employed by those carrying on the process are considerably simplified. The advantage of using a simple type of mixer constitutes a material advantage over the previous methods, because heretofore elaborate and expensive muller types of mixers were required to give the intimate mixture necessary for providing the hardness required. Furthermore, the elimination of a volatile protective fluid has simplified materially the practice of treatment as well as reduced the expense involved in protecting the alkali against premature reaction. Equally important is the avoiding of discomfort to the operators and the convenient method substituted. Also, it has been found that there is no limit to the amount of boric acid which can be added to a quantity of available alkali peroxide or a mixture thereof, that is, within the limits desired in commercial practice.

The reaction of boric acid with alkali peroxide is one of neutralization and this reaction, along with pressure and heat, produces a hard, bonded homogeneous mass. This mass can be quickly and readily removed from the mold and subjected to a granulating operation. Actually, the material in the mold is one solid porous mass and is removed by applying some form of positive pressure or force, as by the blow of a hammer, to eject it from the mold. The material in this state is then granulated or pulverized to reduced the mass to a granular size fit for use in a breathing apparatus canister and to provide the necessary passages and low resistance through a layer of the material for passing vitiated air therethrough. In actual use, it has been found that this material does not swell in reacting with respired air as does that obtained from the use of carbon tetrachloride.

Certain mixtures of ortho boric acid and sodium peroxide as well as mixtures of potassium tetraoxide and combined mixtures of potassium tetraoxide, acid and sodium peroxide have been made, and one that is being used successfully on a commercial scale is that of nine pounds of ortho boric acid and 65 pounds of sodium peroxide. However, this proportion of constituents is not in itself critical, since it has been found that various other proportions of these materials can be used and the amount of each to be used depends upon the physical characteristics desired of the resultant product. If greater hardness and porosity is desirable, additional amounts of boric acid should be added, whereas if the hardness is excessive, less boric acid reduces hardness and porosity. Pressure on the mixture during reaction is a factor affecting hardness but increasing the pressure, while increasing hardness, tends to decrease the porosity.

In reacting with peroxide, it is evident that in all instances a large excess of alkali is present and the acid material added is completely reacted and neutralized. This neutralization process increases the pressure to which the material is originally subjected and along with the heat present produces a resultant homogeneous bonded mass. Ortho boric acid is preferred, since it is the commercial form of this acid, although it is recognized that other acids of boron may be used with a similar effectiveness. As an example, meta boric acid reacts with alkali peroxide under similar conditions, that is, at temperatures and pressures comparable to those required for ortho boric acid, although higher temperatures are required to initiate the processing reaction. Similarly, other acids unreactive with the peroxides under the conditions specified can be used and, as an example, silicic acid can be used as well as other similarly weak acids. Acid salts can be used which have sufficient hydrogen ion concentration. Such acid salts as sodium acid carbonate (NaHCO₃) disodium acid phosphate (Na₂HPO₄) and sodium diacid phosphate (NaH₂PO₄) are satisfactory for imparting the necessary porosity and hardness to the alkali peroxide material and making a suitable mixture for respiratory purposes. The alkali acid sulphates give satisfactory results. The limitation is that the acid material, whether salt or acid, must be unreactive with anhydrous or commercial peroxide at working temperatures which can be readily maintained, but reactive at elevated temperatures and preferably under pressure. Any comminutable substance can be used to form a mixture with the peroxide material if the substance contains an acid hydrogen in its molecule. As the concentration of acid hydrogen is decreased per unit weight of substance added, less reaction occurs and the hardness and porosity of the resultant material is affected. As an example, potassium dibasic phosphate (K₂HPO₄) does not give a material having the hardness and porosity that is obtained by using potassium monobasic phosphate (KH₂PO₄). Also, greater heat and time for reaction is required to carry a less acid salt to completion and it is preferred that adequate acid hydrogen concentration be provided in the substance added. It is apparent that this class of materials is well known in the trade and obvious substitutions can be made for the acid substance used. Boric acid forms the preferred compound for treatment because of its low price and availability and its reactive characteristics with sodium or potassium peroxide or a mixture of both. Since the liquid state of an acid is a state of higher energy than the solid state, the latter is more suitable for my method because the higher energy state causes reaction at a temperature much below the solid state.

While it has been found to be preferable to carry on the reaction under pressure, this is not absolutely necessary because heat can be applied to the mixture in the atmosphere to cause the reaction and a hard porous mass results which is satisfactory for the intended purpose. Also, the mixture can be subjected to pressure to form a cake or compacted mass which is then subjected to heat while exposed to the atmosphere with the result that a reaction takes place and a suitable hard porous mass is formed. This mass is then subjected to a granulating operation such as is done in the preferred method, that is, the mixture is heated while a pressure is maintained thereon.

For some purposes, it is necessary that certain modifications be made in providing an oxygen generating composition reactive at temperatures lower than normal. The application of Carey B. Jackson, filed August 3, 1940, Serial No. 351,257, discloses and claims the addition of lithium oxide to an alkali peroxide. The oxides of lithium, especially lithium hydroxide, are reactive with respired air at temperatures much below the reactive temperatures of either sodium or potassium. This lithium material is added to a mass of sodium or potassium peroxide in such a manner that the reactive temperature of the mass is lowered to a material extent which has made possible use of such regenerating compositions at temperatures as low as −50° F. Such an oxygen generating composition has been made in accordance with my method. As an example, to the proportion of 65 pounds of peroxide and 9 pounds of boric acid has been added slightly less than 4 pounds of comminuted lithium hydroxide. To this mixture, about 11 ounces of a comminuted heavy metal catalyst are added for initiating the reaction between the peroxide and the moisture in the exhaled air in conjunction with the heat liberated by the reaction of lithium hydroxide and carbon dioxide in the air.

As explained previously, the amount of boric acid to the other constituents is not in itself critical since the amount depends upon the degree of hardness required. The addition of lithium hydroxide does not interfere with the neutralization of the boric acid and the product formed is reactive at temperatures as low as the composition made in accordance with previous methods. Consequently, the acid reacts, apparently, with peroxide rather than with lithium hydroxide because the low temperature reactive characteristics are maintained which indicates that the lithium hydroxide added is not materially affected.

It is recognized that certain modifications can be made in performing the physical steps of the method described and it is not intended that this arrangement of steps disclosed be construed as a restriction of the scope of the invention. Also, it is intended that the invention include the product resulting from the practice of my method. According to the provisions of the patent statutes, I have explained the principle and mode of operation of my invention, and have described what I now consider to represent its best embodiment. However, I desire to have it understood that, within the scope of the appended claims, the invention may be practiced otherwise than as specifically described.

I claim:

1. That method of making a composition capable of liberating oxygen upon contact with exhaled air which comprises providing an intimate dry mixture of alkali metal peroxide and a minor proportion of a dry solid acidic substance, and heating said mixture body to initiate reaction between the peroxide and said substance, and thereby producing a hard, bonded and porous mass of said peroxide containing a minor proportion of alkali metal salt of said acidic substance.

2. That method of making a composition capable of liberating oxygen upon contact with exhaled air which comprises intimately mixing dry alkali metal peroxide with a minor proportion of a substantially dry solid acidic substance while maintaining the mixture at a temperature at which substantially no reaction occurs, compressing the resultant mixture into a compacted body, and then heating said body to initiate reaction between said peroxide and said substance and thereby producing a hard, bonded and porous mass of said peroxide containing a minor proportion of alkali metal salt of said acidic substance.

3. That method of making a composition capable of liberating oxygen upon contact with exhaled air which comprises intimately mixing dry alkali metal peroxide with a minor proportion of a substantially dry oxygen acid of boron while maintaining the mixture at a temperature at which substantially no reaction occurs, compressing the resultant mixture into a compacted body, and then heating said body to initiate reaction between said peroxide and said acid and thereby producing a hard, bonded and porous mass of said peroxide containing a minor proportion of alkali metal borate.

4. A method according to claim 3, said acid being orthoboric acid.

5. That method of making a composition capable of liberating oxygen upon contact with exhaled air which comprises intimately mixing dry alkali metal peroxide with a minor proportion of a solid acidic substance while maintaining the mixture at a temperature at which substantially no reaction occurs, compressing the resultant mixture into a compacted body, and then heating said body to initiate reaction while maintaining the compressing pressure thereon and thereby producing a hard, bonded and porous mass of said peroxide containing a minor proportion of alkali metal salt of said acidic substance.

6. That method of making a composition capable of liberating oxygen upon contact with exhaled air which comprises intimately mixing dry alkali metal peroxide with a minor proportion of solid orthoboric acid while maintaining the mixture at a temperature at which substantially no reaction occurs, compressing the resultant mixture into a compacted body, and then heating said body to initiate reaction while maintaining the compressing pressure thereon and thereby producing a hard, bonded and porous mass composed predominantly of said peroxide and containing a minor proportion of alkali metal borate salt of said acidic substance.

7. That method of making a composition capable of liberating oxygen upon contact with exhaled air which comprises intimately mixing dry alkali metal peroxide with a minor proportion of solid orthoboric acid while maintaining the mixture at a temperature not over about 55° F., compressing the resultant mixture into a compacted body, and then heating said body to initiate reaction between said peroxide and said acid and thereby producing a hard, bonded and porous mass of said peroxide containing a minor proportion of alkali metal borate salt of said acidic substance.

8. That method of regenerating exhaled air to render it fit for breathing which comprises passing said air into contact with a hard, porous mass of alkali metal peroxide containing and bonded by a minor porportion of alkali metal salt of a dry solid acidic substance.

9. That method of regenerating exhaled air to render it fit for breathing which comprises passing said air into contact with a hard, bonded and porous mass composed predominantly of said peroxide and containing and bonded by a minor proportion of alkali metal borate.

10. A method according to claim 9, said borate being an orthoborate.

11. As a new composition of matter, a hard and porous body composed of alkali metal peroxide containing and bonded by a minor proportion of an alkali metal salt of a dry solid acidic substance.

12. As a new composition of matter, a hard and porous body composed of alkali metal peroxide containing and bonded by a minor proportion of an alkali metal borate.

13. As a new composition of matter, a hard and porous body composed of alkali metal peroxide containing and bonded by a minor proportion of an alkali metal orthoborate.

14. A method according to claim 6, said peroxide being sodium peroxide.

15. A method according to claim 9, said peroxide being sodium peroxide.

16. A method according to claim 11, said peroxide being sodium peroxide.

DAVID A. FEIGLEY, Jr.